July 13, 1965
SABURO UCHIDA
3,193,934
ALIDADE
Filed Nov. 9, 1962
4 Sheets-Sheet 1
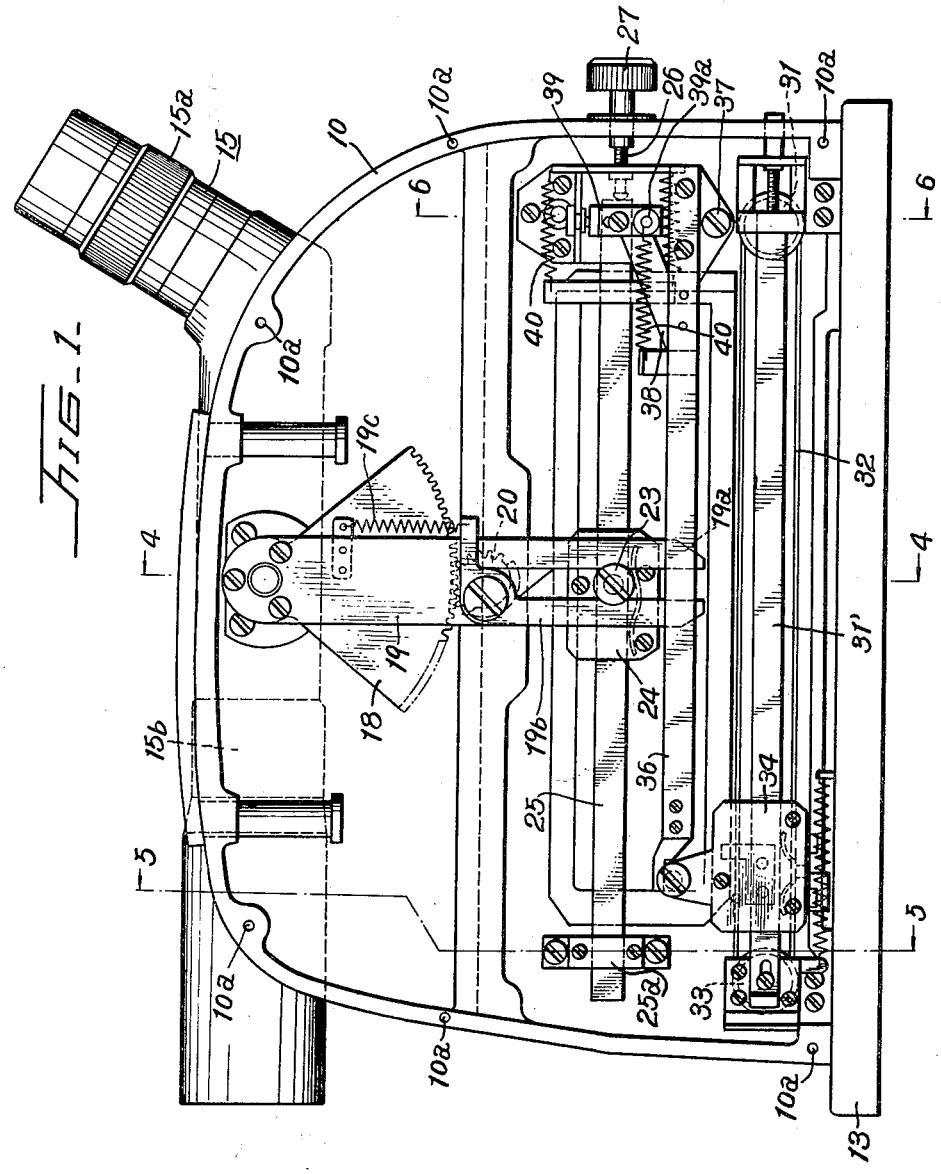
INVENTOR.
Saburo Uchida
BY
Eyre, Mann & Lucas

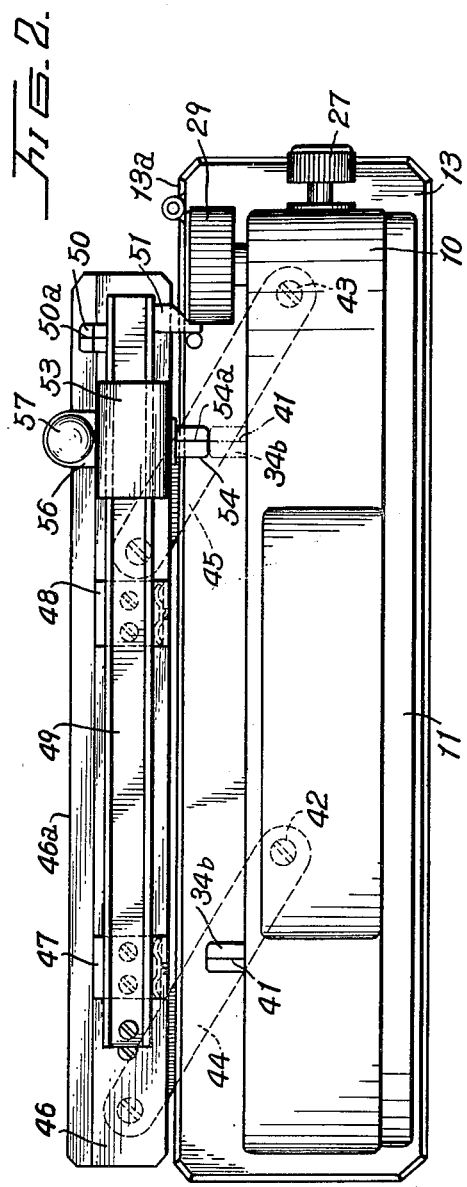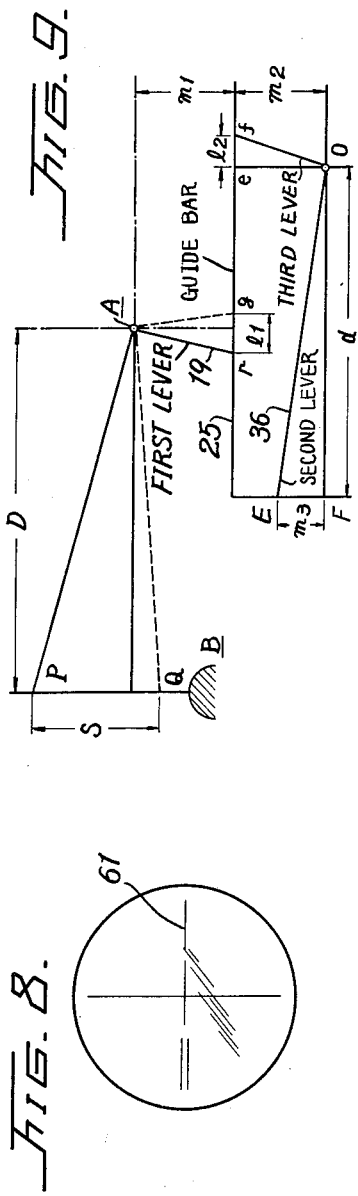

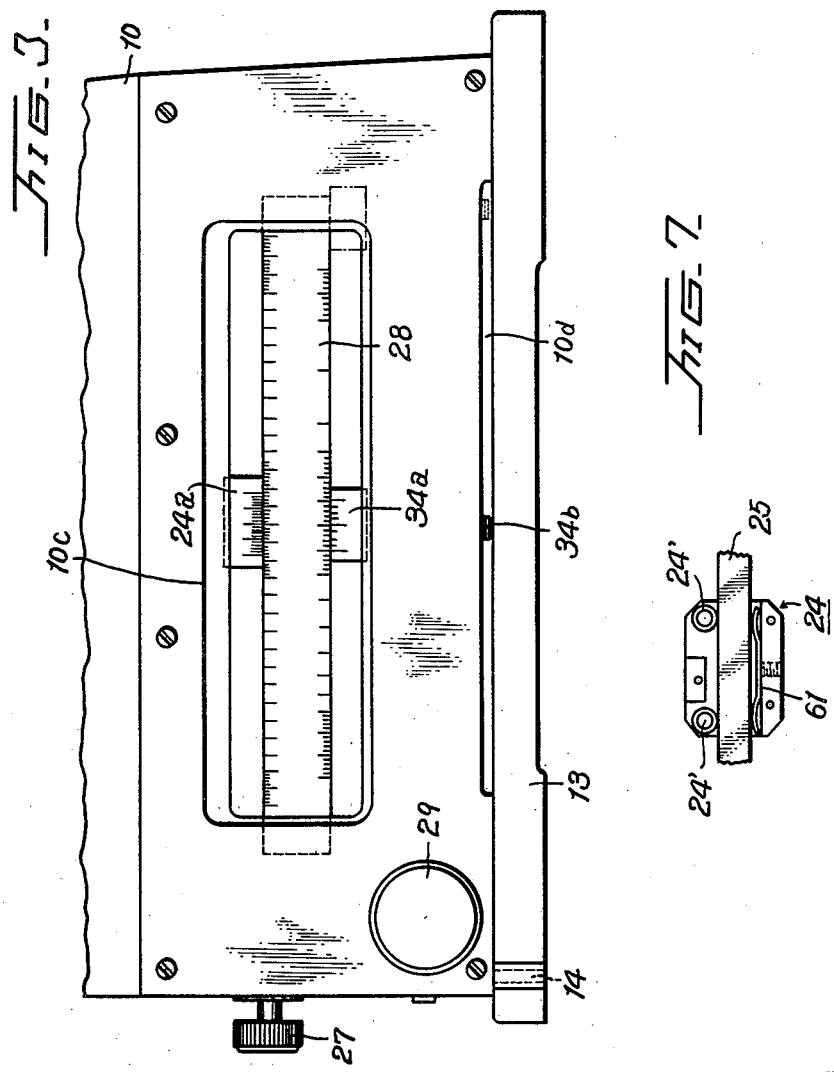

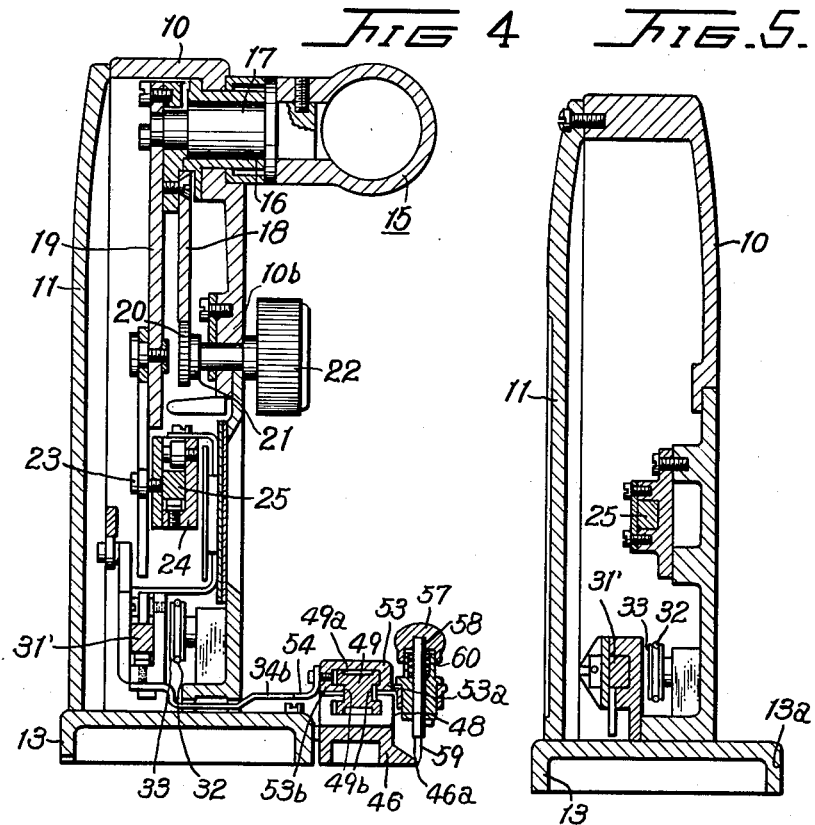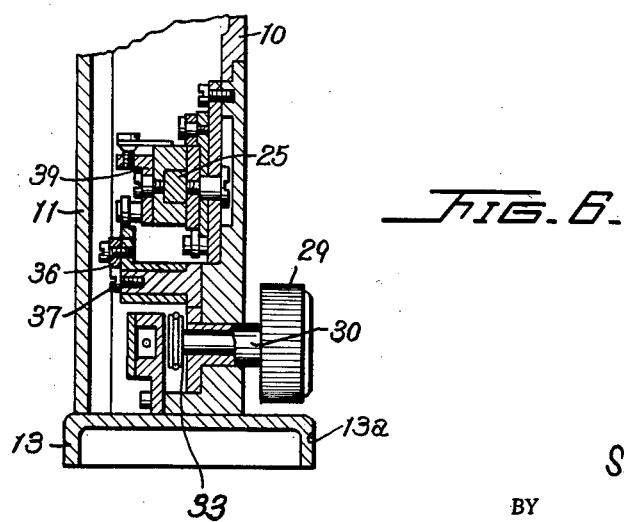

＿＿＿＿＿＿＿＿＿＿＿＿＿＿＿＿＿＿＿＿＿＿＿＿＿＿＿＿＿＿＿＿＿＿＿＿＿＿＿＿＿＿＿＿＿＿＿＿＿＿＿＿＿＿＿＿＿＿＿＿＿＿＿

3,193,934
ALIDADE
Saburo Uchida, 39 Komachi, Kamakura, Japan
Filed Nov. 9, 1962, Ser. No. 236,642
3 Claims. (Cl. 33—67)

This invention relates to alidades used in plane table survey.

It has long been known as the stadia technique to measure the distance between any selected two different stations on the earth surface relying upon telescopic observation of a distance between two horizontal hair lines permanently set in the telescope of a surveying instrument such as transit, level or the like, when viewing a staff positioned at one of said stations from the other station, so as to obviate the troublesome handling of a measuring tape or chain. As commonly known to those skilled in the art, this technique can be brought into effect only through tedious and cumbersome calculation procedures. In addition, if the telescope should view at a certain angle relative to the horizontal on account of differences in levels of the two related stations, the calculation procedure would become still more cumbersome for making the necessary compensation. For these reasons, the stadia technique can not be applied to the plane table survey, wherein normally a number of different distances must be measured from a certain measuring station.

The principal object of the present invention is to provide an improved alidade for use with a plane table for direct-readable indication of the required distance between any selected point on the earth and the measuring point on which the plane table has been set, by simple procedures and with high accuracy.

Another object of the invention is to provide an improved alidade of the kind above referred to, by means of which the thus measured distance can be conveniently plotted on a drawing paper fixedly mounted on the table Further objects, features and advantages of the invention will appear from the detailed description of the preferred embodiment of the invention, which follows in connection with the accompanying drawings. It should however be understood that the embodiment is given only by way of example and a number of modifications therefrom can be made without departing from the spirit and scope of the present invention.

FIG. 1 is a side view of the novel alidade with its cover removed to show the inner operating mechanisms;

FIG. 2 is a top plan view thereof, wherein the telescope is removed for clear illustration of other operating parts;

FIG. 3 is an enlarged side view of the lower part of the alidade seen from the opposite side relative to FIG. 1, omitting the plotting mechanism for clarity but illustrating the angle indicator and the range indicator employed;

FIG. 4 is a cross-section of the alidade taken on a plane 4—4 in FIG. 1;

FIGS. 5 and 6 are respective cross-sections taken on planes 5—5 and 6—6 in FIG. 1; wherein however the telescope and the plotting mechanism employed have been omitted for clarification of the drawing;

FIG. 7 is a detail horizontal section view showing the supporting mechanism which serves for guiding a first slide on a slidable mounted guide bar having considerable frictional resistance;

FIG. 8 is an enlarged diagrammatic representation of the viewiing field of the telescope; and FIG. 9 is an explanatory diagram illustrative of the operating principles of the invention.

Referring to the accompanying drawings, especially FIGS. 1–4 thereof, the novel alidade comprises a housing 10 in which a plurality of operating mechanisms to be described hereinbelow are mounted. The vertical configuration of housing 10 is, as most clearly seen from FIG. 1, a rectangular dome, the top plan view thereof is substantially rectangular as shown in FIG. 2. Either end view of the housing is also substantially a rectangular shape as can be easily seen from FIGS. 2, 4, 5 and 6. Housing 10 is normally closed by a detachable cover 11, which is in turn held in position by means of a plurality of fixing screws, one of which is shown in FIG. 5. In FIG. 1, a plurality of tapped holes 10a are shown which will engage the screws in order to hold cover 11 in place. Housing 10 is rigidly attached to a rectangular base 13 by means of a plurality of fixing screws 14, only one of which is illustrated in FIG. 3 by way of example.

A telescope 15 of substantially conventional design is turnably mounted on the present alidade, the eye piece section of which is however turned upwards and rearwards as shown in FIG. 1 for easy access thereto by an operator. Telescope 15 is provided with a turnable ring 15a for adjustment of the viewing field, shown in FIG. 8. By manipulation of this adjusting ring, the operator may focus the telescope to obtain a clear field. The telescope is provided with a further turnable ring 15b for obtaining the best suitable focal distance of the lens system for the telescope so as to establish a clear sight. For ease in adjusting manipulation, the adjustable rings 15a and 15b are formed thereon with serrations, although only those on ring 15a are shown.

As illustrated in FIG. 4 housing 10 is provided with a bearing 16 at its upper central part, and holds a lateral shaft 17 which is turnably mounted and rigidly fixed at its one end with the central part of the telescope along the longitudinal axis of the telescope and at right angles thereto. At the free end of the lateral shaft 17, a segment gear 18 and a first lever 19 are fixedly mounted, said lever depending and forming at its lower end two forks 19a and 19b. Segment gear 18 meshes with a pinion 20 held by the pinion shaft 21 which passes through a boss 10b on housing 10 and projects some distance therefrom as shown in FIG. 4. The projecting and enlarged end of pinion shaft 21 is fitted with a knob 22. Thus, when this knob is turned in one direction or another, the telescope is caused to turn vertically up or down, as the case may be, through the intermediary of shaft 21, pinion 20, segment gear 18 and lateral shaft 17. It will be clear that the first lever 19 is caused to turn correspondingly in a vertical plane in a clockwise or counter-clockwise direction, as the case may be.

A pin 23 is slidably guided between said two forks 19a and 19b of first lever 19, said pin being fixedly attached to a first slide 24, the latter being slidably mounted on a guide bar 25. The guide bar 25 has a rectangular cross-section as seen from FIG. 4 and is seen as being horizontally mounted in FIG. 1. The slide 24 may slide therealong with a vertical turning movement of the first lever 19, yet with a considerable frictional resistance provided by a spring-loading mechanism, which will be described more fully hereinafter in connection with FIG. 7.

One of said forks 19a is made integral with first lever 19, while the other fork 19b is pivotally mounted on lever 19 and held in pressure engagement with pin 23 by means of a spring 19c so as to improve the measuring accuracy otherwise affected adversely by possible play in sliding contact between pin 23 and said forks.

The lefthand end of guide bar 25 (FIG. 1) is slidably supported in a bearing 25a, which is fixedly mounted on housing 10 by means of a plurality of fixing screws as shown, while the righthand end of guide bar 25 is female-threaded and kept in screw engagement with the male-threaded end of stem 26 of knob 27, although the screw engagement is not shown in the drawing, said stem passing through the dome wall of housing 10 and being mounted for both axial and rotational movements with respect to the housing for endwise fine adjustment of bar 25.

Thus, it will be clear from the foregoing that upon turning knob 27 in one direction or another, guide bar 25 is caused to move rightwards or leftwards in FIG. 1 and motion is transmitted therefrom through slide 24, lever 19 and lateral shaft 17 to telescope 15, for the required fine angular adjustment thereof.

For smooth guiding of slide 24 on guide bar 25, it is provided with a plurality of rollers 24′. In addition, the slide is provided with an arm, on which a vernier scale 24a is mounted, the latter appearing through a window 10c cut through the side wall of housing 10 as shown in FIG. 3. Vernier scale 24a is arranged to slide along the upper edge of an elongated scale 28, which is rigidly fixed to the housing wall by any conventional fixing means, not shown. The scale 28 is provided along its upper edge with angle graduations in tangent values. At the central portion, there is a "O"-mark, which corresponds to the horizontal position of telescope 15 and thus to the precise vertical position of first lever 19. The righthand portion from the "O"-mark indicates tangents of the angles of elevation of telescope 15 from its horizontal position and conversely, the lefthand portion indicates the tangents of angles of depression.

Numeral 29 denotes a range knob, to which a shaft 30 is fixedly attached and which shaft turnably passes through housing wall 10, a pulley 31 being fixedly attached on the opposite end of shaft 30 to the knob 29. A wire 32 is carried around pulleys 31 and 33, the latter being turnably supported on housing wall 10. The opposite ends of wire 32 are fixedly anchored on a second slide 34, which is slidably supported on a guide bar 31′ fixedly supported in parallel to guide bar 25 on base 13, as shown in FIG. 1. A motion transmitting lever 36, frequently called "second lever" hereinafter, is pivotally mounted about pivot 37 and kept in contact with said second slide 34 by gravity action. In FIG. 1, the second slide 34 is shown at its left extreme position and in this position it is in contact with a curved recess formed on the free end of lever 36. When range knob 29 is turned manually in the counter-clockwise direction in FIG. 3, motion is correspondingly transmitted through pulleys 31 and 33 and wire 32 to slide 34, thereby the latter being caused to shift rightwards in FIG. 1 and thus lever 36 being pushed up so as to turn clockwise in the same figure about the pivot 37, which is turnably mounted in housing wall 10. In the neighborhood of said pivot, lever 36 is provided fixedly with a pusher projection 38, which cooperates with a mating stop 39a formed on a movable mounting member 39 attached fixedly to the upper guide bar 25 in the neighborhood of the righthand end thereof in FIG. 1, said projection and stop being in constant pressure engagement with each other by means of spring 40 tensioned between a fixed point on housing 10 and said stop. Upon clockwise turning movement of lever 36, upper guide bar 25 together with mounting member 39 is caused to shift rightwards in FIG. 1, resulting in the telescope correspondingly turning downwards.

On the contrary, when the range knob is turned in the opposite direction, the opposite movement of the related parts will take place and thus slide 34 is caused to shift leftwards in FIG. 1, resulting in the lever 36 turning correspondingly in the downward direction and the telescope turning upwards.

An arm carrying vernier scale 34a is fixedly attached to the second slide 34, said vernier being arranged again to cooperate with elongated scale 28 as shown in FIG. 3. For this purpose, scale 28 is cut along its lower edge with range graduations as shown.

Between housing 10 and base 13, there is a horizontally elongated slot 10d, from which projects the free end of an arm 34b fixedly attached to second slide 34, an indicator line 41 being cut at the center of the free end of said arm, the purpose of which will be described in detail hereinafter in connection with the operation of the alidade.

On the bottom of base 13, a pair of parallel bars 44 and 45 are pivotally mounted by means of pivot screws 42 and 43, respectively, and a support bar 46 connects pivotally the free ends of said parallel bars, said support bar 46 being arranged in parallel to the imaginary line connecting the centers of the pivot screws. In this manner, parallel bars 44 and 45 and support bar 46 constitute a parallel motion mechanism and at any selected angular position of said parallel bars, support bar 46 is always held parallel with the optical axis of telescope 15. The cross-section of bar 46 is selected to be similar to that of the conventional alidade, as clearly seen from FIG. 4. Two separate guide channels 47 and 48 are fixedly mounted on bar 46 and an elongated slide 49, frequently called "third slide," is slidably mounted thereon, the sliding movement of this slide encountering a proper amount of resistance provided by guide channels 47 and 48. The third slide is shaped substantially as a rail, as seen from FIG. 4 and is provided with a longitudinal groove 49a on its upper surface extending over the entire length thereof. Slide 49 has fixedly attached thereto a zero-indicating finger 50 near the front end thereof, which finger is formed with a zero-mark 50a, as clearly seen from FIG. 2. Third slide 49 is further provided with a further finger 51 slightly offset in the longitudinal direction relative to said zero-indicator finger 50 and in the laterally opposite direction thereto. A stop 52 shaped in the form of a screw head is fixedly mounted on base 13. In FIG. 2, finger 51 is shown as contacting with stop 52. In this position, elongated slide 49 can not slide any further in a forward direction.

Elongated slide 49 mounts in turn a fourth further slide 53, which is freely slidable thereon. Fourth slide 53 has substantially a channel section and two depending legs formed at its lowermost ends with opposite and inward projections 53a and 53b slidably held in engagement with grooves 49a and 49b, respectively, which are formed in the opposite surfaces of a web of slide 49 and extend over the entire length thereof, so that slide 53 may be positively guided thereon.

Slide 53 has an indicator finger 54 rigidly attached thereto at the bottom of one of said opposite projections 53a at a level slightly higher than the upper surface of base 13, an indicator line 54a being cut laterally on the alidade and at the center of the upper surface of the finger. On the bottom surface of second slide 34, there is provided fixedly a finger denoted by numeral 34b, which finger projects outwards through elongated window 10d and is provided with an indicator line 41 directed laterally on the alidade, as already mentioned. The two fingers 54 and 34b lie in a common horizontal plane and the shapes and dimensions of these two fingers are so selected that when the fourth slide 53 is positioned on the third slide 49 with the latter placed alongside base 13 so as to bring said two fingers into registration with each other, the extreme free ends of these fingers may be held nearly in contact with each other. In this position, indicator lines 54a and 41 are in a line.

A lateral projection 56 extends from fourth slide 53 and in the opposite direction relative to finger 54, and vertical pin 58 is slidably mounted in projection 56, which has an operating head 57 at its upper end and a needle 59 at its lower end fixedly attached thereto. The plotting means consisting of pin 58 and needle 59 is held normally in its upper or ineffective position by means of spring 60 urging resiliently the pin upwards. When a finger pressure is manually exerted upon head 57 against spring action so as to lower pin 58 and thus needle 59, a fine hole may be formed on the drawing paper at a position corresponding to the selected position of the fourth slide and in the close proximity of the outside edge 46a of support bar 46.

In the following, the operation of the novel alidade and then the principles embodied therein will be described in detail:

At first, the plane table is set above any selected station as denoted by reference character A in FIG. 9 as in the conventional technique. A range rod is then held vertical on any selected point on the earth, as denoted by B in the same figure. The distance between these two points A and B is to be measured. On the range rod, a pair of separated marks P and Q having a predetermined distance, generally shown by S in FIG. 9, has been marked. The distance S may be, by way of example, 500 mm. for a plotting scale of 1/500; 1000 mm. for 1/1000 or 2000 mm. for 1/2000.

Having thus completed the preliminary operation, telescopic 15 is directed substantially towards the range rod and the rear end of the outside edge of support bar 46 is placed at a proper distance of several cm. measured leftwards and frontwards from a properly selected origin on the drawing in vertical resistration of the measuring station on the earth. Next, the parallel mechanism explained above is adjusted so as to position support bar 46 alongside the outside edge 13a of base 13. Then, third slide 49 is adjusted in its position upon support bar 46 so as to bring finger 51 into contact with stop 52 on base 13, as shown in FIG. 2. The parallel motion mechanism is further manipulated so as to shift support bar 46 from base 13 for bringing zero-indicator finger 50 towards the origin on the drawing. If the indicating line on finger 50 should coincide in this case with the origin, the selected position of the alidade is correct. If not, the alidade as a whole is displaced properly in consideration of the deviation observed upon the above trial-and-error adjustment. When the above adjustment is repeated, it will normally be found that the deviation between the indicating line on finger 50 and the drawing origin is smaller than that observed upon the first adjustment, or occasionally will be nil. In the former case, the adjusting procedure is repeated again and again until the observed deviation becomes nil, which indicates that the desired correct position of the alidade has been attained.

With the alidade positioned on the drawing in the above mentioned way, range knob 29 is fully turned in the clockwise direction in FIG. 3, thereby second slide 34 being brought to its extreme lefthand position as represented in FIG. 1 and kept in engagement with a recessed free end of second lever 36. With the slide 34 in this position, the vernier scale 34a thereof will be positioned outside the effective range of range graduations on scale 28, which means that the vernier 34a in this case is positioned at a position corresponding to a practically infinite range and such a position of the vernier is illustrated in FIG. 3 by dotted lines.

The alidade as a whole is then directed towards the range rod and the two adjusting rings 15a and 15b of telescope 15 are adjusted as in the conventional technique so as to establish a clear image of the pole and a clear cross hair, the latter being illustrated in FIG. 8 as already referred to. Knob 22 is turned so as to bring the horizontal hair line 61 of the cross hair into coincidence with the upper range mark P on the pole rod. As already explained, first lever 19 is caused thereby to turn and the first slide 24 is shifted horizontally in the corresponding manner, resulting in the vernier 24a sliding along the upper edge of elongated scale 28. In this case, rough adjustment of the vertical angle of telescope 15 is carried into effect by manual operation of knob 22, while the fine adjustment is made by means of fine adjusting knob 27.

Then, range knob 29 is again adjusted so as to turn in the counter-clockwise direction in FIG. 3 and thereby second slide 34 is caused to slide on guide bar 31' rightwards in FIG. 1 and second lever 36 is kept in contact with the slide and turned in a clockwise direction in FIG. 1. Motion is transmitted from the second lever 36 through the engagement between projection 38, which is effectively pivoted with lever 36 at 37 and will be designated as the third lever, and stop 39a to guide bar 25, which is thus shifted horizontally rightwards in FIG. 1, accompanying first slide 24. Thus, first lever 19 is turned counter-clockwise in FIG. 1 through sliding engagement of pin 23 with fork ends 19a and 19b and telescope 15 is turned correspondingly downwards in unison with lateral shaft 17. In this way, the range knob is manipulated until the horizontal hair line 61 is brought into coincidence with the lower range mark Q on the range rod. By this manipulation, vernier scale 34a attached to the second slide is shifted from right to left in FIG. 3 and finally positioned at a position as illustrated by way of example in the same figure by full lines. Thus, the required range can be directly read by observing the now attained position of vernier 34a in reference to the range graduations on scale 28.

For plotting the thus measured position upon the drawing paper on the plane table, manipulate the parallel motion mechanism so as to bring the plotting mechanism comprising support bar 46 and the compound slide 49 and 53 mounted thereon, into contact with base 13. Next, shift fourth slide 53 along the third slide 49 so as to bring the indicating line on finger 54 into registration with that on finger 34b. Upon completion of the above adjustment, the parallel motion mechanism as a whole is again manipulated so as to separate support bar 46 from base 13 and bring the outside edge of the bar into coincidence with the origin on the drawing paper. Thereupon, exert a finger pressure upon the head 57 so as to depress needle 59 for making a small hole in the drawing paper. The distance between the hole and the origin represents the precise horizontal distance between the measuring station and the range rod, when read in the specific scale.

With the present alidade, the specific ratio of heights at the two related levels can also be determined relying upon the angle graduations on scale 28, substantially as in the conventional technique.

In the following, the principles for determining the distance between any selected two positions on the earth in the above mentioned manner will be described in detail in connection with FIG. 9:

In this figure, A denotes the aforementioned measuring station, yet being illustrated as if it were on the crossing point between the optical axis of telescope 15 and that of lateral shaft 17. First, second and third levers and the guide bar are denoted by similar reference numerals as used in the foregoing description. As indicated above the third lever is an arm of lever 36. It extends from a point O corresponding substantially to the said pivot 37, to a point $f$ on the axis of the guide bar, at which the latter is adapted to receive a pushing force when the fourth lever pivots in the clockwise direction. The third lever is arranged to establish a right angle relation with the second lever at its pivotally supported end, and passes through the central axis of the said stop 39a.

From the drawing, it will be clear that $$APQ \backsim Apq$$

thus, $$D/S = M_1/l_1$$

therefore, $$D = S \cdot \frac{m_1}{l_1}$$

On the other hand $$OEF \backsim oef$$

thus, $$d/m_3 = m_2/l_2$$

therefore, $$l_2 = \frac{m_2 \cdot m_3}{d}$$

In the present alidade, $l_1$ is equal to $l_2$, so that $$D = S \cdot \frac{m_1}{m_2 \cdot m_3} \cdot d$$

wherein, $m_1$, $m_2$ and $m_3$ are constants as determined by the specific construction of the alidade. Now, denoting the term $$\frac{m_1}{m_2 \cdot m_3}$$

by K, which is also a constant. Then, $$D = S \cdot K \cdot d$$

Based upon this formula, the range graduations on scale 28 can be easily cut. In the present embodiment, this procedure has been further simplified by selecting the value of K to be unity, so that $$D = S \cdot d$$

Thus, $$\frac{d}{D} = \frac{1}{S} \qquad (1)$$

It will be clear from above, that S is the denominator for the said range scale, and denotes at the same time the base length between the range marks on the range rod.

In the foregoing example, the lengths $l_1$ and $l_2$ are assumed to be equal for better understanding the principles of the invention, but the invention is not limited to such a specific example. Even when $l_1/l_2$ is selected to be a constant value, and other constants are properly selected so as to establish the above Formula 1, the alidade will operate in a similar manner.

The plotting mechanism includes the aforementioned parallel mechanism, the principle of which is conventional and need not be disclosed in more detail herein.

When it is desired to measure the height ratio between any selected two stations on the earth, the corresponding vertical angle is measured by means of the telescope as in the above mentioned way and the tangent value is read off on the tangent gradation formed along the upper edge of the elongated scale 28. Although not shown, a chart is supplied together with the alidade so as to find the correct angular values in consulation with a number of curves on the chart. Such technique however is well known by those skilled in the art, so that further detail description would be unnecessary.

As was already described, first slide 24 slides on guide bar 25 with a considerable frictional resistance. The amount of this resistance is so selected that when telescope 15 is turned by the manipulation of knob 22, the slide 24 may slide on the guide bar 25 correspondingly, but, conversely, when range knob 29 is manipulated for range finding so as to turn the telescope downwards, enough frictional resistance can be provided for assuring the desired unitary motion of guide bar 25 and first slide 24 for the realization thereof. In this way, the telescope can be manipulated in the precisely corresponding manner upon any manipulation of range knob 29. An embodiment for providing such frictional resistance is shown in FIG. 7, in which a spring means 61 is resiliently attached to first slide 24 and acting upon guide bar 25. Guide rollers 24' are also mounted turnably on first slide 24 so as to move along guide bar 25, so that relatively smooth guiding is assured for the said slide, in spite of the aforementioned frictional resistance.

It will be understood that modifications and variations of the invention disclosed herein may be resorted to without departing from the scope of the concepts of the present invention. Therefore, the scope of the invention should be limited only by the scope and proper interpretation of the claims appended hereto.

What I claim is:

1. Alidade assembly, comprising a housing; a telescope turnably mounted on said housing; a first lever rigidly connected with said telescope for turning in a first plane and in unison therewith; a first manual control for initiating the unitary movement of said first telescope and said lever; a guide means formed in the shape of a linear bar and mounted slidably in said housing and arranged in a second plane substantially perpendicular to the first plane; a fine adjusting means for precise positioning of said guide means; a first slide slidably mounted on said guide means with considerable frictional resistance and kept in sliding contact with the lower end of said first lever; a second slide slidable on a guide bar and controlled in its position upon manual control of a range knob; a second lever pivotally mounted in said housing for pivotal movement in a said first plane upon movement of said second slide; a motion transmitting mechanism for transmitting any movement of the second lever in one direction to said guide means and thence to said telescope through said first slide and said first lever; and means for indicating the selected position of the second slide for providing a corresponding direct range reading.

2. Alidade assembly, comprising a housing; a telescope turnably mounted on said housing; a first lever rigidly connected with said telescope for turning in a vertical plane and in unison therewith; a first manual control for initiating the unitary movement of said telescope and said lever; a guide means formed in the shape of a linear bar and mounted slidably in said housing and arranged in a horizontal plane; a fine adjusting means for precise positioning of said guide means; a first slide slidably mounted on said guide means with a considerable frictional resistance and kept in sliding contact with the lower end of said first lever; a second slide slidable on a horizontal guide bar and controlled in its position upon manual control of a range knob; a second lever pivotally mounted in said housing for pivotal movement in a vertical plane upon movement of said second slide; a motion transmitting mechanism for transmitting any movement of the second lever in one direction to said guide means and thence to said telescope through said first slide and said first lever; means for indicating the selected position of the second slide for providing a corresponding direct range reading; and a parallel motion mechanism for plotting said range information on a drawing paper on the plane table with which said alidade cooperates.

3. The alidade assembly as claimed in claim 2 wherein said parallel motion mechanism comprises a compound slide comprising three slides, the slides being slidably mounted one on the other for movement along a common axis, one slide having attached thereto a manual point marking arrangement.

References Cited by the Examiner

UNITED STATES PATENTS 1,665,002   4/28   Von Gruber _____ 33—67

FOREIGN PATENTS 535,485   1/22   France.
125,355   11/01  Germany.
526,260   5/55   Italy.
47,580    6/09   Switzerland.
55,769    3/11   Switzerland.
242,647   10/46  Switzerland.

ROBERT B. HULL, *Primary Examiner.*